US008635892B2

(12) United States Patent
Suzumura et al.

(10) Patent No.: US 8,635,892 B2
(45) Date of Patent: Jan. 28, 2014

(54) VEHICLE DOOR LOCK DEVICE

(75) Inventors: Makoto Suzumura, Chita (JP); Takashi Nishio, Kariya (JP); Nobuko Watanabe, Anjo (JP); Masayuki Tomochika, Anjo (JP); Masanari Iwata, Ichinomiya (JP); Yasuhiko Sono, Hekinan (JP); Ryujiro Akizuki, Novi, MI (US)

(73) Assignee: Aisin Seiki Kabushiki Kaisha, Kariya-Shi, Aichi-Ken (JP)

(*) Notice: Subject to any disclaimer, the term of this patent is extended or adjusted under 35 U.S.C. 154(b) by 175 days.

(21) Appl. No.: 13/284,042

(22) Filed: Oct. 28, 2011

(65) Prior Publication Data

US 2012/0247160 A1 Oct. 4, 2012

(30) Foreign Application Priority Data

Mar. 30, 2011 (JP) .................................. 2011-75527
Sep. 28, 2011 (JP) ................................ 2011-212519

(51) Int. Cl.
*B60R 25/00* (2013.01)

(52) U.S. Cl.
USPC ......................... 70/237; 70/252; 292/DIG. 23

(58) Field of Classification Search
USPC ......... 70/91, 237, 238, 379 R, 380, 256, 257, 70/279.1, 461, 465, 252; 292/144, 201, 292/DIG. 23
See application file for complete search history.

(56) References Cited

U.S. PATENT DOCUMENTS 4,936,122 A * 6/1990 Osada ............................ 70/214
5,931,035 A * 8/1999 Bolton ........................... 70/367
6,007,117 A * 12/1999 Spindler ...................... 292/199
6,439,011 B1 * 8/2002 Frick et al. ...................... 70/185
6,938,446 B2 * 9/2005 Fukunaga et al. ............. 70/237
7,055,351 B2 * 6/2006 Suzuki et al. .................. 70/186
7,121,126 B2 * 10/2006 Zillmann ........................ 70/186
7,213,428 B2 * 5/2007 Harada et al. .................. 70/256

(Continued)

FOREIGN PATENT DOCUMENTS

| | | | |
|---|---|---|---|
| JP | 4237089 | B2 | 10/2005 |
| JP | 2008-240451 | A | 10/2008 |
| JP | 2011-026826 | A | 2/2011 |
| WO | WO 2011/010553 | A1 | 1/2011 |

OTHER PUBLICATIONS

Search Report dated Nov. 29, 2011, issued by the Japanese Patent Office in its capacity as the International Searching Authority in corresponding International Patent Application No. PCT/JP2011/074291. (2 pages).

*Primary Examiner* — Suzanne Barrett
(74) *Attorney, Agent, or Firm* — Buchanan Ingersoll & Rooney PC

(57) ABSTRACT

An outside locking lever of a lever mechanism section in a lock mechanism of a vehicle door lock apparatus includes a hub portion being rotatable relative to a housing and having a connection subportion to which an inner end portion of a rod is connected in a torque transmittable manner; an arm portion extending radially outward from the hub portion and linked to an active lever; a hub-side engagement subportion provided on the hub portion and engaged in the vehicle interior-exterior direction with a first support portion of the housing; an arm-side engagement subportion provided on the arm portion and engaged in the vehicle interior-exterior direction with a second support portion of the housing; and a fragile portion provided between the two engagement portions and being breakable with a force of a predetermined value or greater. A space for allowing breakage at the fragile portion is provided within the housing.

20 Claims, 6 Drawing Sheets

(56) References Cited

U.S. PATENT DOCUMENTS

| | | | | |
|---|---|---|---|---|
| 7,302,818 | B2 * | 12/2007 | Usuzaki et al. | 70/256 |
| 7,703,310 | B2 * | 4/2010 | Usuzaki et al. | 70/237 |
| 7,823,426 | B2 * | 11/2010 | Okuno et al. | 70/186 |
| 8,001,814 | B2 * | 8/2011 | Okada et al. | 70/186 |
| 8,033,148 | B2 * | 10/2011 | Okada et al. | 70/186 |
| 8,438,888 | B2 * | 5/2013 | Akizuki et al. | 70/237 |
| 2009/0266122 | A1 * | 10/2009 | Okada et al. | 70/252 |
| 2010/0064742 | A1 * | 3/2010 | Okada et al. | 70/185 |

* cited by examiner

VEHICLE DOOR LOCK DEVICE

TECHNICAL FIELD

This disclosure relates to a door lock apparatus for a vehicle.

BACKGROUND DISCUSSION

A door lock apparatus for a vehicle generally includes a latch mechanism which brings a vehicle door to a closed state (latched state) or an openable state (unlatched state), and a lock mechanism which makes a changeover between an unlocked state for enabling the latch mechanism to shift from the latching state to the unlatching state, and a locked state for disabling the latch mechanism from shifting from the latching state to the unlatching state.

One type of the above-mentioned lock mechanism includes an opening mechanism section having an outside opening lever, an inside opening lever, an opening link, and an active lever; an electric actuator section for driving the opening link to an unlocking position or a locking position via the active lever; and a lever mechanism section for driving, independent of the electric actuator section, the opening link to the unlocking position or the locking position via the active lever. Such a type of the lock mechanism is disclosed in, for example, Japanese Patent Application Laid-Open (kokai) No. 2011-26826 (Reference Document 1).

When the opening link is in the unlocking position, the latch mechanism can shift from the latching state to the unlatching state through operation of the outside opening lever or the inside opening lever in association with an opening operation of an outside handle or an inside handle provided on a vehicle door, so that the closed vehicle door can be opened. When the opening link is in the locking position, the latch mechanism cannot shift from the latching state to the unlatching state through operation of the outside opening lever or the inside opening lever in association with the opening operation of the outside handle or the inside handle.

The lever mechanism section of the vehicle door lock apparatus described in Reference Document 1 mentioned above is connected, via a rod, to a key cylinder disposed in an outside handle of a vehicle door and is configured such that the active lever performs a locking operation or an unlocking operation in response to a turning operation of the key cylinder. In a locking operation (movement from an unlocking position to a locking position) of the active lever, the opening link is driven from the unlocking position to the locking position. In an unlocking operation (movement from the locking position to the unlocking position) of the active lever, the opening link is driven from the locking position to the unlocking position.

The lever mechanism section includes an outside locking lever (may be called a key rotor) linked to the rod and rotatably mounted to a housing mounted within the door, and a key lever which is rotatably mounted within the housing, rotates together with the outside locking lever, and is linked to the active lever. The key lever includes a hub portion which is rotatably supported by the housing and the outside locking lever and which is connected to the outside locking lever in a torque transmissible manner; a first arm portion which extends radially outward from the hub portion and can be engaged with a first engagement portion of the active lever; and a second arm portion which extends radially outward from the hub portion and can be engaged with a second engagement portion of the active lever.

Meanwhile, the vehicle door lock mechanism described in the above Reference Document 1 has a fragile portion provided between the hub portion of the key lever and the second arm portion. The fragile portion is breakable when the rod is pushed toward the key lever with a force of a predetermined value or greater. Thus, when the rod is pushed toward the key lever with a force of a predetermined value or greater, the key lever breaks at the fragile portion. In such a breakage condition, in the key lever, rotation is not transmitted from the hub portion to the second arm portion. Accordingly, even when the outside locking lever is rotated in an unlocking direction in response to a turning operation of the key cylinder, the active lever in the locking position is not pivotally moved in the unlocking direction, thereby maintaining the locked state. Therefore, the door lock apparatus can be enhanced in anti-theft function.

Also, in the vehicle door lock apparatus described in the above Reference Document 1, the housing has a breakage aid portion which aids breakage at the fragile portion of the key lever when the rod is pushed toward the key lever with a force of a predetermined value or greater. Thus, as compared with the case where the housing does not have the breakage aid portion, when the rod is pushed toward the key lever with a force of a predetermined value or greater, breakage at the fragile portion of the key lever can be ensured, whereby the anti-theft function of the door lock apparatus can be further enhanced.

In the vehicle door lock apparatus described in the above Reference Document 1, the housing does not have therein a space for allowing the hub portion of the key lever to move in a vehicle interior-exterior direction. Thus, in order to effect breakage at the fragile portion of the key lever, the housing must be deformed or broken toward the outside of the housing. Therefore, a space for allowing deformation or breakage of the housing must be provided at the outside of the housing, thereby limiting mountability on a vehicle.

SUMMARY

A door lock apparatus for a vehicle disclosed herein comprises a lever mechanism section adaptively configured to be connected, via a rod, to a key cylinder disposed in an outside handle of a vehicle door, and adaptively configured such that an active lever of a lock mechanism performs a locking operation or an unlocking operation in response to a turning operation of the key cylinder. The lever mechanism section comprises an outside locking lever adaptively linked to the rod and to the active lever and rotatably mounted to a housing mounted within the door. The outside locking lever comprises a hub portion rotatably mounted to the housing and having a connection subportion to which an inner end portion of the rod is adaptively connected in such a manner as to be able to transmit torque in a vehicle interior-exterior direction; an arm portion extending radially outward from the hub portion and linked to the active lever; a hub-side engagement subportion provided on the hub portion and engaged in the vehicle interior-exterior direction with a first support portion provided on the housing; an arm-side engagement subportion provided on the arm portion and engaged in the vehicle interior-exterior direction with a second support portion provided on the housing; and a fragile portion provided between the hub-side engagement subportion and the arm-side engagement subportion and being breakable with a force of a predetermined value or greater. When the rod is pushed inward with respect to the vehicle interior-exterior direction, and an associated pushing force is imposed on the outside locking lever, the pushing force is received by the first support portion and the second support portion of the housing. A space for allowing breakage at the fragile portion is provided within the housing.

The space which allows breakage at the fragile portion does not necessarily mean only an initially provided space (e.g., a space which allows movement of the hub portion in the vehicle interior-exterior direction so as to allow breakage of the fragile portion), but also encompasses a space which is formed as a result of breakage or elastic deformation of the hub portion.

DETAILED DESCRIPTION

Figure 1:
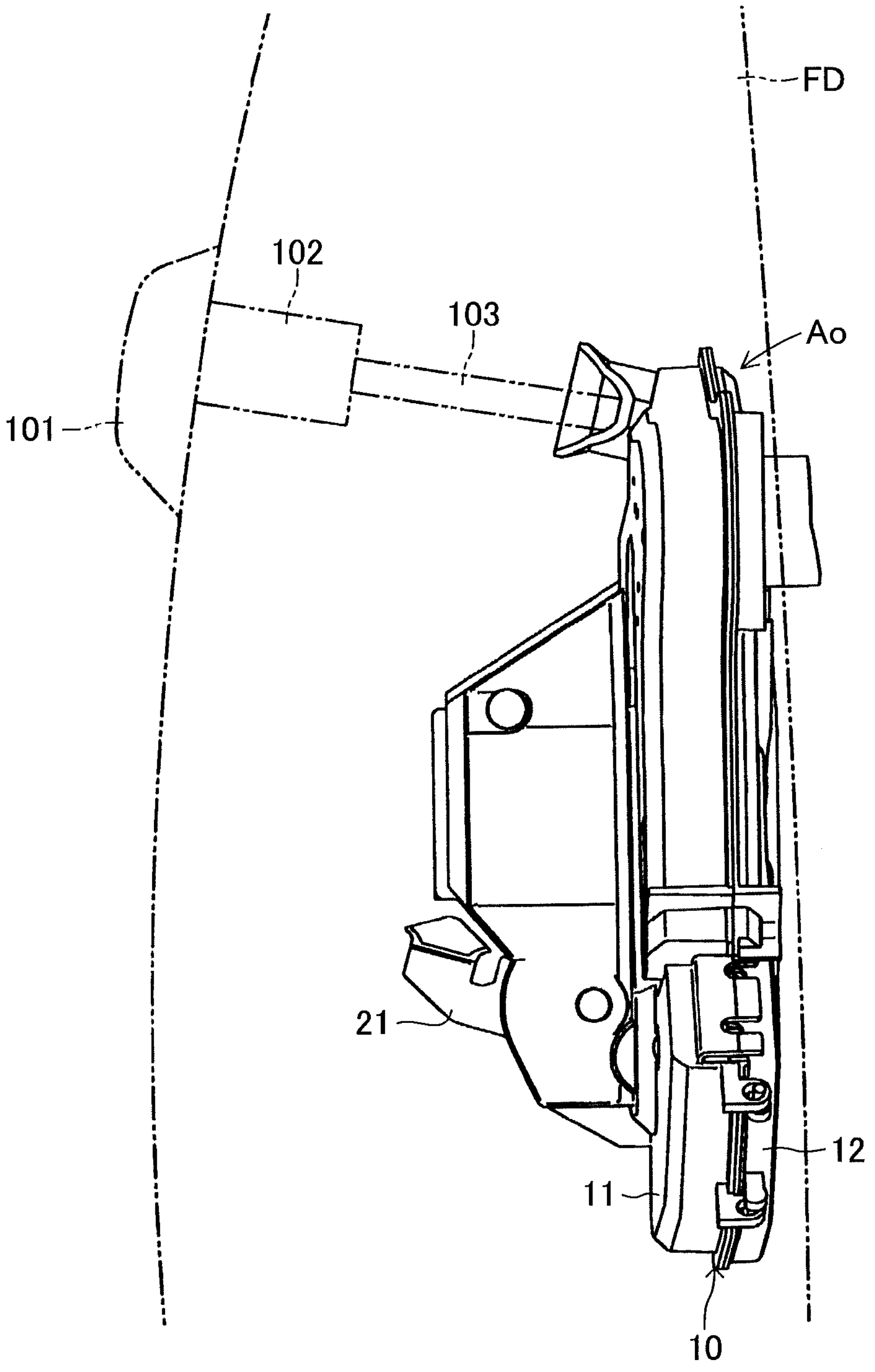
FIG. 1 is a front view of a door lock apparatus for a vehicle according to an embodiment disclosed here as viewed from the front side of a door in which the vehicle door lock apparatus is mounted.

An embodiment disclosed here will be explained with reference to the attached drawings. FIGS. 1 to 4 show a door lock apparatus Ao for a vehicle of the embodiment. The vehicle door lock apparatus Ao is mounted to a front right door FD of a vehicle. As shown in FIG. 2, the vehicle door lock apparatus Ao includes a latch mechanism A1 and a lock mechanism A2, which are mounted to a housing 10. As shown in FIGS. 1 to 4, the housing 10 includes a housing body 11 disposed on a side toward the vehicle exterior, and a housing cover 12 assembled to the housing body 11 and disposed on a side toward the vehicle interior.

The latch mechanism A1 is adapted to bring the door FD into a closed state (latched state) or an openable state (unlatched state) relative to the body of a vehicle (vehicle body). As well known, the latch mechanism A1 includes a latch 51 which can be engaged with and disengaged from a striker (not shown) fixed to the vehicle body. The latch mechanism A1 is mounted to the door FD while being mounted to the housing 10. The latch mechanism A1 holds the door FD in the closed state (latched state) by means of the latch 51 being engaged with the striker. When the door FD is in the closed state, by means of the latch 51 being disengaged from the striker, the latch mechanism A1 shifts the door FD from the closed state to the openable state (unlatching state). Description of a detailed configuration of the latch mechanism A1 is omitted.

The lock mechanism A2 is adapted to make a changeover between an unlocked state which enables the latch mechanism A1 to shift from the latching state to the unlatching state and a locked state which disables the latch mechanism A1 from shifting from the latching state to the unlatching state. The lock mechanism A2 includes an opening mechanism section A2*a*, an electric actuator section A2*b*, and a lever mechanism section A2*c*. The opening mechanism section A2*a* includes an outside opening lever 21, an inside opening lever 22, an opening link 23, and an active lever 24.

Figure 2:
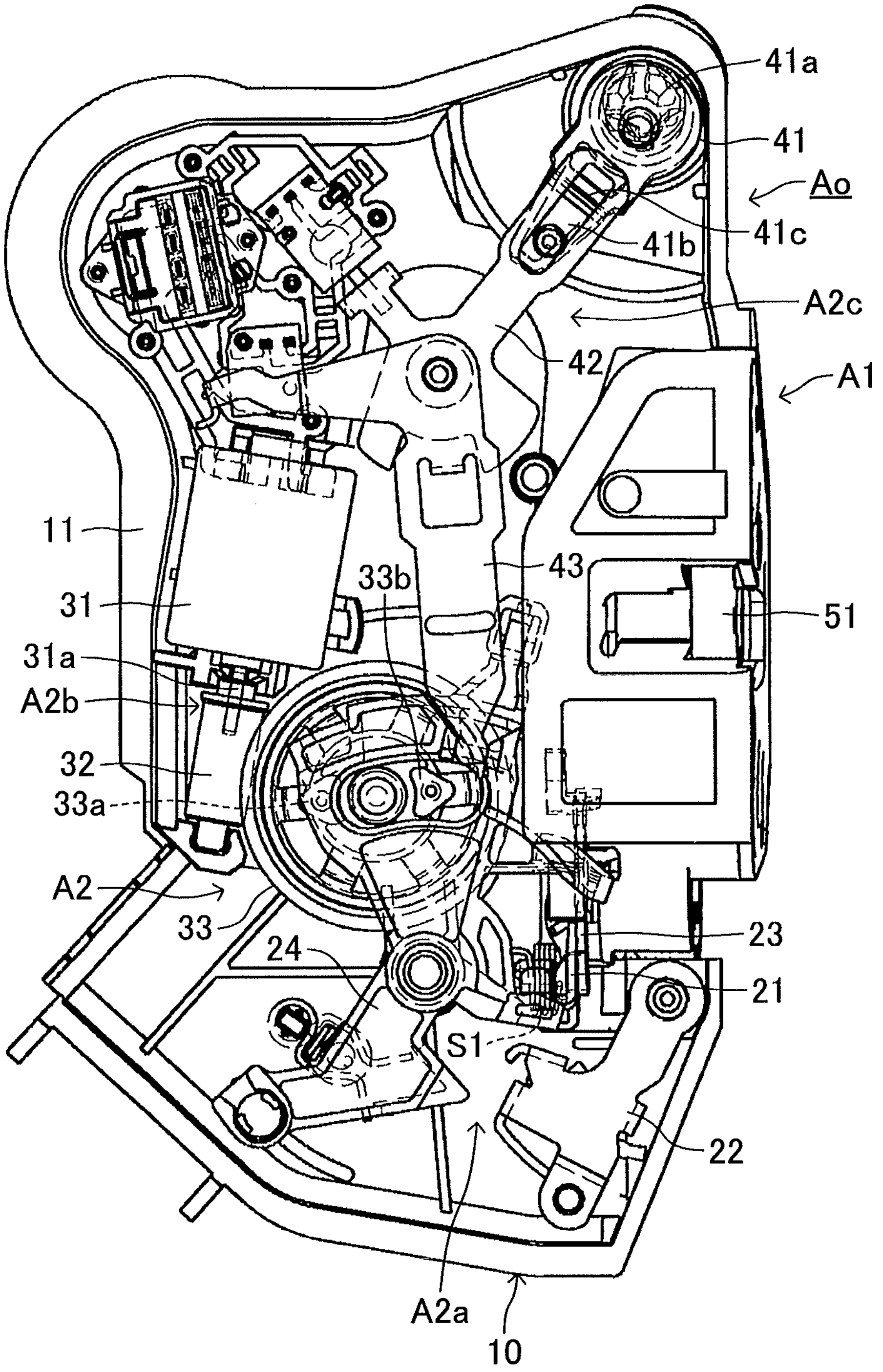
FIG. 2 is a side view showing the configuration of essential members of the vehicle door lock apparatus in an unlocking state as viewed (in a state in which a housing cover of a housing is removed from a housing body) from the vehicle interior.

The outside opening lever 21, together with a torsion spring S1, is mounted to the housing body 11; is rotatable relative to the housing body 11; is linked, via a link mechanism (not shown), to an outside handle 101 (see FIG. 1) provided on the door FD on a side toward the compartment exterior; and pivots in the counterclockwise direction of FIG. 1 in response to pulling (opening) of the outside handle 101.

The inside opening lever 22 is rotatably mounted to the housing body 11; is linked to an inside handle (not shown) provided on the door FD on a side toward the compartment interior; and pivots in the clockwise direction of FIG. 2 in response to pulling of an inside handle. The opening link 23 is swingably connected to and supported at its lower end portion by the outside opening lever 21 and can be moved, by the active lever 24, between an unlocking position (the position shown in FIG. 2) and a locking position. When the opening link 23 is in the unlocking position, the opening link 23 can be engaged with a lift lever (not shown) of the latch mechanism A1 for bringing the door FD to the openable state. When the opening link 23 is in the locking position, the opening link 23 cannot be engaged with the lift lever (not shown) of the latch mechanism A1.

Upon reception of the operation of the outside opening lever 21 (when the outside handle 101 is pulled) or upon reception of the operation of the inside opening lever 22 (when the inside handle is pulled), the opening link 23 moves upward in FIG. 2 from the position shown in FIG. 2. Here, there is assumed a case where the door FD is in the closed state and the opening link 23 is in the unlocking position shown in FIG. 2. In such a case, when the opening link 23 is moved upward upon reception of the operation of the outside opening lever 21 or the inside opening lever 22, the lift lever (not shown) of the latch mechanism A1 is pushed by the opening link 23 and thus pivots, whereby the latch mechanism A1 operates from the latching state to the unlatching state. Accordingly, the door FD shifts from the closed state to the openable state. That is, when the opening link 23 is in the unlocking position, the door FD is unlocked.

Next, there is assumed a case where the door FD is in the closed state and the opening link 23 is in the locking position. In such a case, when the opening link 23 is moved upward upon reception of the operation of the outside opening lever 21 or the inside opening lever 22, the opening link 23 does not engage with the lift lever (not shown) of the latch mechanism A1; thus, the latch mechanism A1 remains in the latching state. Accordingly, the door FD remains closed. That is, when the opening link 23 is in the locking position, the door FD is locked.

The electric actuator section A2*b* is adapted to drive the opening link 23 to the unlocking position or the locking position via the active lever 24. The electric actuator section A2*b* includes an electric motor 31, a worm 32, and a worm wheel 33. The electric motor 31 is a publicly known motor and is driven in response to a locking operation or an unlocking operation which is effected by a locking-unlocking operation device, such as a remote controller. The worm 32 is unitarily provided on an output shaft 31*a* of the electric motor 31 and is rotatably driven by the electric motor 31. The worm wheel 33 is rotatably driven by the worm 32; is rotatably mounted to the housing 10; and includes a pair of cams 33*a* and 33*b* engaged with a pair of cam followers (detailed description thereof is omitted, but is represented by a broken line in FIG. 3) provided on the active lever 24.

In the electric actuator section A2*b*, when the active lever 24 is in the unlocking position shown in FIG. 2, and the locking-unlocking operation device (e.g., a remote controller for actuating the electric motor 31) effects a locking operation, the electric motor 31 rotatably drives the worm wheel 33 via the worm 32 by about 180 degrees in the counterclockwise direction in FIG. 2, whereby the active lever 24 moves to the locking position. When the active lever 24 is in the locking position, and the locking-unlocking operation device effects an unlocking operation, the electric motor 31 rotatably drives the worm wheel 33 via the worm 32 by about 180 degrees in the clockwise direction in FIG. 2, whereby the active lever 24 moves to the unlocking position shown in FIG. 2.

The lever mechanism section A2*c* is adapted to drive, independent of the electric actuator section A2*b*, the opening link 23 to the unlocking position or the locking position via the active lever 24. The lever mechanism section A2*c* is connected, via a rod 103, to a key cylinder 102 disposed in the outside handle 101 as shown in FIG. 1 and includes an outside locking lever 41, a key switch lever 42, a locking control lever 43, etc., as shown in FIG. 2.

The outside locking lever 41 is rotatably mounted to the housing 10; is linked to the rod 103; and is linked to the active lever 24 via the key switch lever 42 and the locking control lever 43. The key switch lever 42 is rotatably mounted to the housing 10 and is configured to be able to transmit movement of the outside locking lever 41 to the locking control lever 43. The locking control lever 43 is rotatably mounted to the housing 10 and is configured to be able to transmit movement of the key switch lever 42 to the active lever 24.

In the lever mechanism section A2*c*, when the active lever 24 is in the unlocking position shown in FIG. 2, and the outside locking lever 41 is rotated in the counterclockwise direction in FIG. 2 by a predetermined amount in response to a locking rotary operation of the key cylinder 102, the key switch lever 42 is rotated in the clockwise direction in FIG. 2, and the locking control lever 43 is rotated in the clockwise direction in FIG. 2, whereby the active lever 24 moves to the locking position. When the active lever 24 is in the locking position, and the key cylinder 102 undergoes an unlocking rotary operation, an operation reverse to the above operation is effected, whereby the active lever 24 moves to the unlocking position shown in FIG. 2.

Figure 3:
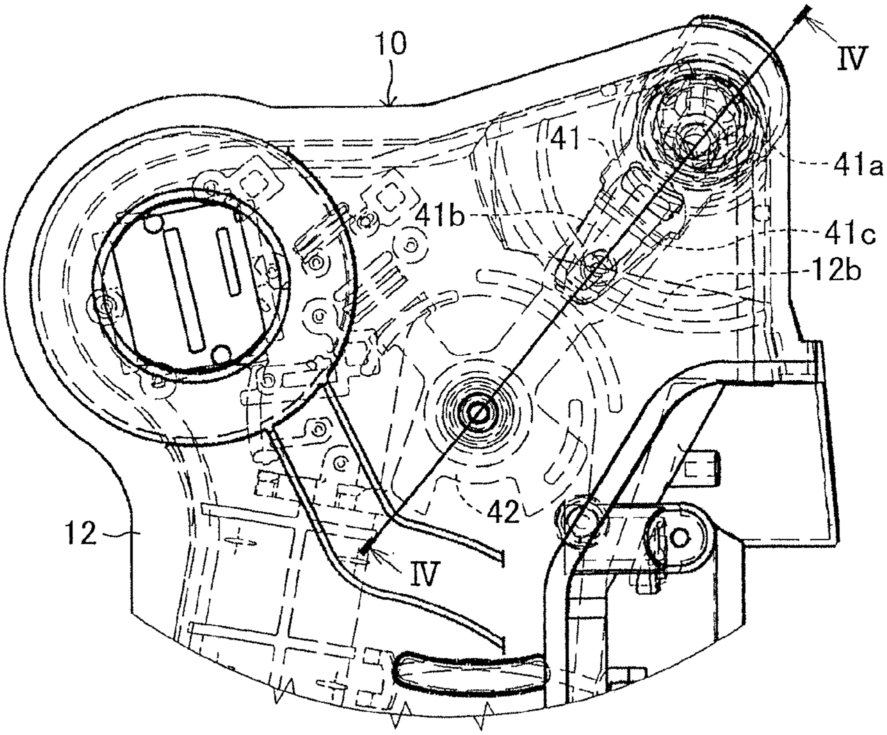
FIG. 3 is a fragmentary, enlarged, side view showing in detail the region of disposition of an outside locking lever in a state shown in FIG. 2 (as viewed in a state in which the housing cover is mounted to the housing body)
Figure 4:
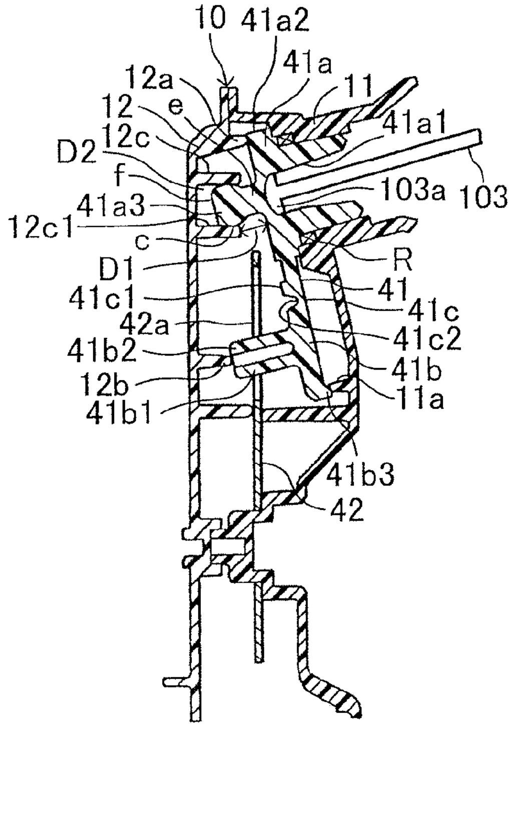
FIG. 4 is a sectional view taken along line IV-IV of FIG. 3.
Figure 5:
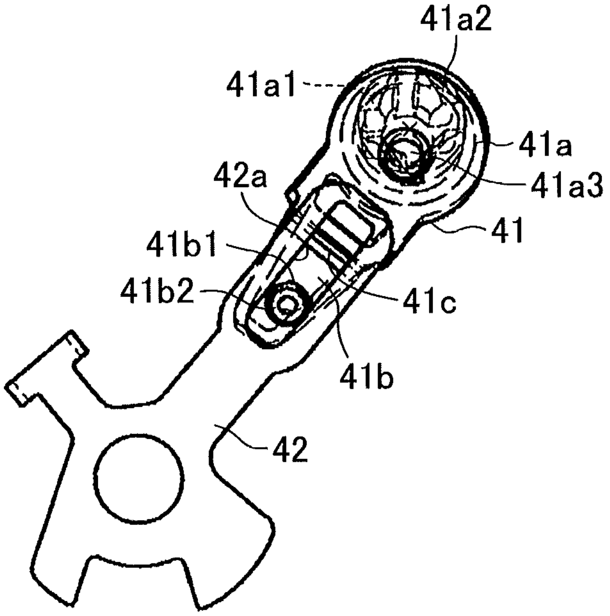
FIG. 5 is an enlarged view of the outside locking lever and a key switch lever shown in FIGS. 2 and 3.

Meanwhile, in the present embodiment, as shown in FIGS. 2 to 4, the outside locking lever 41 includes a hub portion 41*a*, an arm portion 41*b*, and a fragile portion 41*c*. The hub portion 41*a* has a connection hole subportion 41*a*1 into which an inner end portion 103*a* of the rod 103 is inserted in a vehicle width direction (vehicle interior-exterior direction) for establishing torque transmissible connection. The hub portion 41*a* is rotatably mounted to the housing 10 via a seal ring R. The hub portion 41*a* has a hub-side engagement subportion 41*a*2 which is engaged in the vehicle width direction with a first support portion 12*a* provided on the housing cover 12 of the housing 10.

The arm portion 41*b* extends radially outward from the hub portion 41*a* (more specifically, radially outward from the center of rotation of the hub portion 41*a*); is linked to the active lever 24 via the key switch lever 42 and the locking control lever 43; and has a pin subportion 41*b*1 engaged with an elongated hole 42*a* provided in the key switch lever 42. The arm portion 41*b* has an arm-side engagement subportion 41*b*2 which is engaged in the vehicle width direction with a second support portion 12*b* provided on the housing cover 12 of the housing 10. The second support portion 12*b* is formed into an arc shape along the locus of rotation of the pin subportion 41*b*1 (see FIG. 2).

The fragile portion 41*c* is provided in an intermediate region of the arm portion 41*b* between the hub-side engagement subportion 41*a*2 and the arm-side engagement subportion 41*b*2. The fragile portion 41*c* is configured to be breakable with a force of a predetermined value or greater (as shown in FIG. 7, a pushing force F with which the rod 103 is pushed inward with respect to the vehicle width direction). The fragile portion 41*c* is formed into a tangential shape tangent to the locus of rotation of the arm portion 41*b* and is composed of a straight-lined ridge subportion (thick-walled subportion) 41*c*1 and a straight-lined groove subportion (thin-walled subportion) 41*c*2 (see FIGS. 4 and 6). The position of disposition of the fragile portion 41*c* is not limited to an intermediate region of the arm portion 41*b* between the hub-side engagement subportion 41*a*2 and the arm-side engagement subportion 41*b*2 in the outside locking lever 41 so long as the fragile portion 41*c* is disposed between the hub-side engagement subportion 41*a*2 and the arm-side engagement subportion 41*b*2 in the outside locking lever 41.

Also, in the present embodiment, when the rod 103 is pushed inward with respect to the vehicle width direction, and an associated pushing force is imposed on the outside locking lever 41, the pushing force is received by the first support portion 12*a* and the second support portion 12*b* provided on the housing cover 12 of the housing 10. Furthermore, a space D1 is provided within the housing 10 for allowing movement of the hub portion 41*a* in the vehicle width direction to thereby allow breakage at the fragile portion 41*c*.

Also, in the present embodiment, the hub portion 41*a* of the outside locking lever 41 has a second hub-side engagement subportion 41*a*3 slidable in the vehicle width direction along a guide portion 12*c* provided between the first support portion 12*a* and the second support portion 12*b* of the housing cover 12 in the housing 10. The guide portion 12*c* is a recess which is recessed toward the interior of the vehicle, and is formed into a cylindrical shape. The guide portion 12*c* may be formed into a shape other than a cylindrical shape. For example, the guide portion 12*c* may be formed into a tubular shape having a square cross section.

The second hub-side engagement subportion 41*a*3 assumes the form of a spindle portion (41*a*3) which is rotatably supported in the guide portion 12*c*; the spindle portion (41*a*3) has a curved subportion c projecting toward a peripheral wall (inner surface) 12*c*1 of the guide portion 12*c*; and the curved subportion c is supported to be slidable in the vehicle width direction by the peripheral wall 12*c*1 of the guide portion 12*c*. An end of the spindle portion (41*a*3) at the curved subportion c is chamfered into a plane face f, thereby securing a space D2 (D1>D2) within the guide portion 12*c* for allowing movement of the hub portion 41*a* in the vehicle width direction to thereby allow breakage at the fragile portion 41*c*. The curved subportion c may be, for example, spherical or may have the shape of a flattened sphere. The plane face f formed through chamfering is not limited to the one orthogonal to the axis of the spindle portion (41*a*3), but may be formed as appropriate.

Also, in the present embodiment, the arm portion 41*b* of the outside locking lever 41 has a second arm-side engagement subportion 41*b*3. The second arm-side engagement subportion 41*b*3 is engaged in the vehicle width direction with a third support portion 11*a* which is provided on the housing body 11 of the housing 10 in such a manner as to face the second support portion 12*b* of the housing cover 12 of the housing 10.

In the vehicle door lock apparatus Ao of the above-described embodiment, since the space D1 is provided within the housing 10 for allowing movement, in the vehicle width direction, of the hub portion 41*a* of the outside locking lever 41 of the lever mechanism section A2*c* to thereby allow breakage at the fragile portion 41*c*, there is no need to provide a space at the outside of the housing 10 for allowing breakage at the fragile portion 41*c*, whereby mountability on a vehicle can be improved.

Also, in the present embodiment, the hub portion 41*a* of the outside locking lever 41 of the lever mechanism section A2*c* has the second hub-side engagement subportion 41*a*3 slidable in the vehicle width direction along the guide portion 12*c* provided between the first support portion 12*a* and the second support portion 12*b* of the housing cover 12. Thus, when the pushing force F from the rod 103 is imposed on the outside locking lever 41, an associated movement of the hub portion 41*a* can be guided by the guide portion 12*c*, whereby the pushing force F from the rod 103 can be imposed reliably on the fragile portion 41*c*. Therefore, breakage can take place reliably at the fragile portion 41*c*.

Also, in the present embodiment, the guide portion 12*c* is formed cylindrically; the second hub-side engagement subportion 41*a*3 assumes the form of a spindle portion; and the spindle portion has, at its end, a spherical subportion which is rotatable within the guide portion 12*c* and is slidable in the vehicle width direction within the guide portion 12*c*. Thus, the mechanism can be embodied in a simple configuration. Also, the spherical subportion is chamfered at its tip, thereby forming the plane face f orthogonal to the axis of the spindle portion. By virtue of the chamfering, the space D2 for allowing movement of the hub portion 41*a* in the vehicle width direction can be secured within the cylindrical guide portion 12*c*. Thus, the mechanism can be embodied in a compact configuration.

Also, in the present embodiment, the arm portion 41*b* has the second arm-side engagement subportion 41*b*3, and the second arm-side engagement subportion 41*b*3 is engaged in the vehicle width direction with the third support portion 11*a* which is provided on the housing 10 in such a manner as to face the second support portion 12*b* of the housing 10. Thus, when the pushing force F from the rod 103 is imposed on the outside locking lever 41, an associated movement of the arm portion 41*b* can be restricted by the second support portion 12*b* and the third support portion 11*a* of the housing 10. Therefore, breakage can take place reliably at the fragile portion 41*c*.

Figure 6:
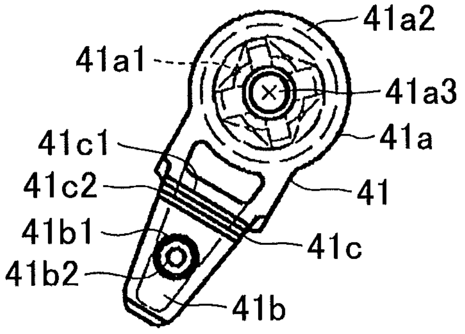
FIG. 6 is a side view of the outside locking lever shown in FIG. 5.
Figure 7:
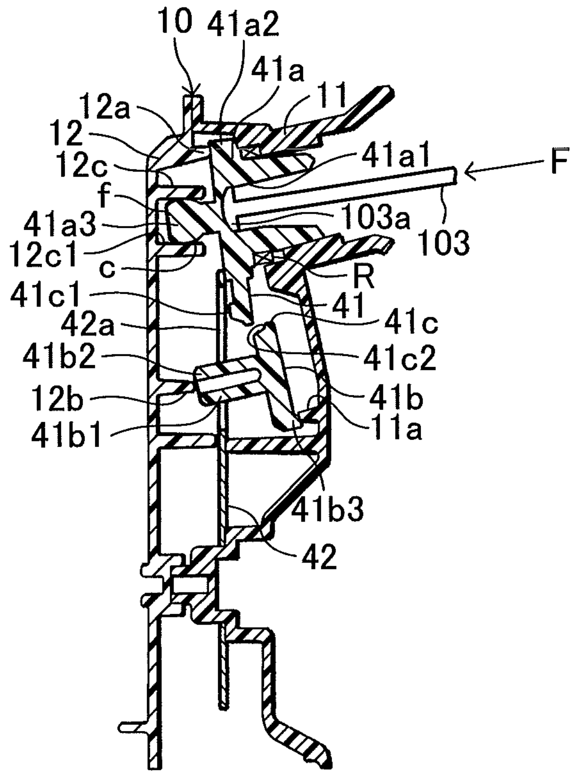
FIG. 7 is a sectional view showing a state in which the outside locking lever is broken at a fragile portion as a result of a pushing force from a rod being imposed in the direction of the arrow on the outside locking lever shown in FIG. 4.
Figure 8:
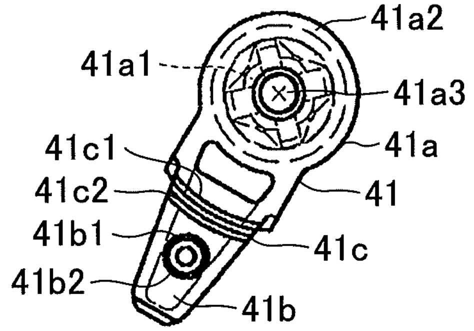
FIG. 8 is a side view equivalent to FIG. 6, showing a modified embodiment of the outside locking lever.

In the above-described embodiment, the fragile portion 41*c* is formed into a tangential shape tangent to the locus of rotation of the arm portion 41*c* (see the straight-lined ridge subportion 41*c*1 and the straight-lined groove subportion 41*c*2 in FIG. 6). However, the fragile portion 41*c* can be formed into an arc shape along the locus of rotation of the arm portion 41*c* (see an arc ridge subportion 41*c*1 and an arc groove subportion 41*c*2 in FIG. 8). In either embodiment, the fragile portion 41*c* can be embodied inexpensively in a simple shape.

Also, in the above-described embodiment, the arm portion 41*b* of the outside locking lever 41 has the second arm-side engagement subportion 41*b*3, and the housing 10 has the third support portion 11*a*. However, the second arm-side engagement subportion 41*b*3 and the third support portion 11*a* can be eliminated. Also, in the above-described embodiment, the hub portion 41*a* of the outside locking lever 41 has the second hub-side engagement subportion 41*a*3, and the housing 10 has the guide portion 12*c*. However, the second hub-side engagement subportion 41*a*3 and the guide portion 12*c* can be eliminated.

Figure 9:
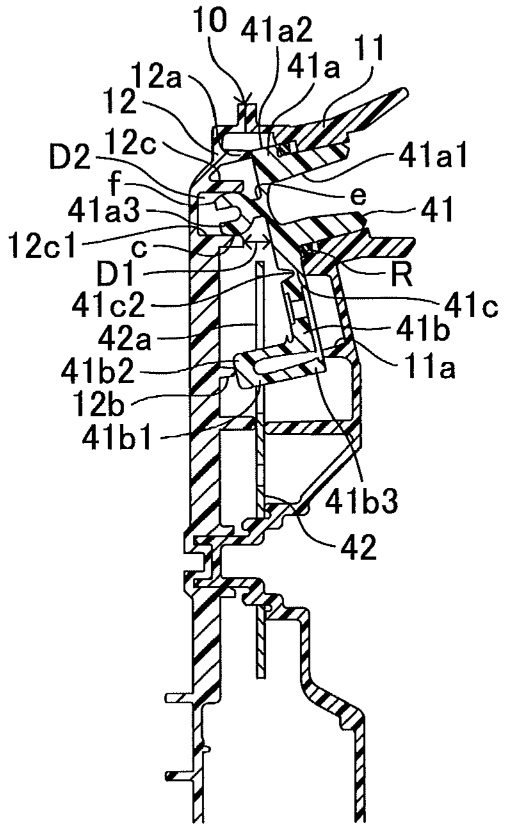
FIG. 9 is a sectional view equivalent to FIG. 4, showing another modified embodiment of the outside locking lever.

Also, in the above-described embodiment, as shown in FIG. 4, the second hub-side engagement subportion (spindle portion) 41*a*3 provided on the hub portion 41*a* of the outside locking lever 41 is formed such that the curved subportion c serves as a head subportion and such that a subportion that supports the curved subportion c serves as a neck subportion e, and the neck subportion e is hard to be elastically deformed. However, an embodiment shown in FIG. 9 is also possible. Specifically, the second hub-side engagement subportion (spindle portion) 41*a*3 provided on the hub portion 41*a* of the outside locking lever 41 is formed such that the curved subportion c serves as a head subportion and such that a subportion that supports the curved subportion c serves as the neck subportion e; the neck subportion e is thinner than that shown in FIG. 4 and is elastically deformable; and the curved subportion (head subportion) c can tilt through elastic deformation of the neck subportion e. In this case, by virtue of tilting of the curved subportion (head subportion) c through elastic deformation of the neck subportion e, the curved subportion (head subportion) c can smoothly slide along the guide portion 12*c*.

In the embodiment shown in FIG. 9 (an embodiment in which the second hub-side engagement subportion (spindle portion) 41*a*3 provided on the hub portion 41*a* of the outside locking lever 41 is formed such that the curved subportion c serves as a head subportion and such that a subportion that supports the curved subportion c serves as the neck subportion e), the neck subportion e is breakable, and the neck subportion e can break before the fragile portion 41*c* breaks. In this case, by virtue of breakage of the neck subportion e, a space for facilitating movement of the neck subportion e can be secured in a region associated with the breakage. Thus, a pushing force from the rod 103 can be imposed far more reliably on the fragile portion 41*c*.

In the embodiment shown in FIG. 9, the fragile portion 41*c* is disposed in a region of the outside locking lever 41 between the hub-side engagement subportion 41*a*2 and the arm-side engagement subportion 41*b*2 (a joint region between the hub portion 41*a* and the arm portion 41*b*), and is not disposed in an intermediate region of the arm portion 41*b*. Also, in the embodiment shown in FIG. 9, the fragile portion 41*c* assumes the form of the straight-lined groove subportion (thin-walled subportion) 41*c*2 and does not include the equivalent of the straight-lined ridge subportion (thick-walled subportion) 41*c*1 shown in FIGS. 4 and 6. Configurational features of the embodiment shown in FIG. 9 other than those mentioned above are substantially similar to those shown in FIG. 4 and thus are denoted by the same reference numerals as those appearing in FIG. 4, and repeated description thereof is omitted.

According to the above-described embodiment, the present invention is embodied in the vehicle door lock apparatus Ao in which the lock mechanism A2 includes the opening mechanism section A2*a* as well as the electric actuator section A2*b* and the lever mechanism section A2*c*. However, the present invention can also be embodied in a vehicle door lock apparatus in which the lock mechanism (A2) includes the opening mechanism section (A2*a*) and the lever mechanism section (A2*c*), but does not include the electric actuator section (A2*b*).

Also, according to the above-described embodiment, the present invention is embodied in the door FD (side door) which is mounted at the front right side of a vehicle. However, the present invention can also be similarly embodied not only in other side doors but also in doors (e.g., a laterally opening back door) other than side doors. According to the above-described embodiment, the present invention is embodied in such a configuration that an inner end portion of the rod 103 is connected to the connection hole subportion 41*a*1 of the outside locking lever 41 in a torque transmissible manner. However, the present invention can also be embodied in such a configuration that an inner end portion of the rod has a connection hole subportion to which a protrusion provided on the outside locking lever is connected in a torque transmissible manner.

In the above-described vehicle door lock apparatus, since a space for allowing breakage at the fragile portion is provided within the housing, there is no need to provide a space at the outside of the housing for allowing breakage at the fragile portion, whereby mountability on a vehicle can be improved.

In the above-described vehicle door lock apparatus, the following configuration is possible: the hub portion has the second hub-side engagement subportion slidable in the vehicle interior-exterior direction along the guide portion provided between the first support portion and the second support portion of the housing. In this case, when a pushing force from the rod is imposed on the outside locking lever, an associated movement of the hub portion can be guided by the guide portion, whereby the pushing force from the rod can be imposed reliably on the fragile portion. Therefore, breakage can take place reliably at the fragile portion.

In this case, the following configuration is possible: the guide portion assumes the form of a recess which is recessed toward the interior of the vehicle; the second hub-side engagement subportion assumes the form of a spindle portion which is rotatably supported in the recess; the spindle portion has a curved subportion projecting toward a peripheral wall of the recess; and the curved subportion is slidably supported by the peripheral wall of the recess. In this case, the mechanism can be embodied in a simple configuration. In this case, the following configuration is possible: the spindle portion is formed such that the curved subportion serves as a head subportion and such that a subportion that supports the curved subportion serves as a neck subportion; the neck subportion is elastically deformable; and the head subportion can tilt through elastic deformation of the neck subportion. In this case, by virtue of tilting of the head subportion through elastic deformation of the neck subportion, the curved subportion can smoothly slide along the guide portion. Also, in this case, the following configuration is possible: the spindle portion is formed such that the curved subportion serves as a head subportion and such that a subportion that supports the curved subportion serves as a neck subportion; the neck subportion is breakable; and the neck subportion breaks before the fragile portion breaks. In this case, by virtue of breakage of the neck subportion, a space for facilitating movement of the neck subportion can be secured in a region associated with the breakage. Thus, a pushing force from the rod can be imposed far more reliably on the fragile portion.

In these cases, the following configuration is possible: an end of the spindle portion at the curved subportion is chamfered. In this case, by virtue of the chamfering, a space for allowing movement of the hub portion in the vehicle interior-exterior direction can be secured within the guide portion. Thus, the mechanism can be embodied in a compact configuration.

Also, in the above-described vehicle door lock apparatus, the following configuration is possible: the arm portion has a second arm-side engagement subportion engaged in the vehicle interior-exterior direction with a third support portion which is provided on the housing in such a manner as to face the second support portion of the housing. In this case, when a pushing force from the rod is imposed on the outside locking lever, an associated movement of the arm portion can be restricted by the second support portion and the third support portion of the housing. Therefore, breakage can take place reliably at the fragile portion.

Also, in the above-described vehicle door lock apparatus, the following configuration is possible: the fragile portion is formed into an arc shape along the locus of rotation of the arm portion or into a tangential shape tangent to the locus of rotation of the arm portion. In this case, the fragile portion can be embodied inexpensively in a simple shape.

What is claimed is:

1. A door lock apparatus for a vehicle, comprising a lever mechanism section configured to be connected, by a rod, to a key cylinder disposed in an outside handle of a vehicle door, and configured such that an active lever of a lock mechanism performs a locking operation or an unlocking operation in response to a turning operation of the key cylinder, the lever mechanism section comprises an outside locking lever linked to the rod and to the active lever and rotatably mounted to a housing mounted within the door;

the outside locking lever comprises:

a hub portion rotatably mounted to the housing and having a connection subportion to which an inner end portion of the rod is connected in such a manner as to be able to transmit torque in a vehicle interior-exterior direction;

an arm portion extending radially outward from the hub portion and linked to the active lever;

a hub-side engagement subportion provided on the hub portion and engaged in the vehicle interior-exterior direction with a first support portion provided on the housing;

an arm-side engagement subportion provided on the arm portion and engaged in the vehicle interior-exterior direction with a second support portion provided on the housing; and a fragile portion provided between the hub-side engagement subportion and the arm-side engagement subportion and being breakable with a force of a predetermined value or greater;

when the rod is pushed inward with respect to the vehicle interior-exterior direction, and an associated pushing force is imposed on the outside locking lever, the pushing force is received by the first support portion and the second support portion of the housing; and a space for allowing breakage at the fragile portion is provided within the housing.

2. A door lock apparatus for a vehicle, comprising a lever mechanism section configured to be connected, by a rod, to a key cylinder disposed in an outside handle of a vehicle door, and configured such that an active lever of a lock mechanism performs a locking operation or an unlocking operation in response to a turning operation of the key cylinder, the lever mechanism section comprises an outside locking lever linked to the rod and to the active lever and rotatably mounted to a housing mounted within the door;

the outside locking lever comprises:

a hub portion rotatably mounted to the housing and having a connection subportion to which an inner end portion of the rod is connected in such a manner as to be able to transmit torque in a vehicle interior-exterior direction;

an arm portion extending radially outward from the hub portion and linked to the active lever;

a hub-side engagement subportion provided on the hub portion and engaged in the vehicle interior-exterior direction with a first support portion provided on the housing;

an arm-side engagement subportion provided on the arm portion and engaged in the vehicle interior-exterior direction with a second support portion provided on the housing; and a fragile portion provided between the hub-side engagement subportion and the arm-side engagement subportion and being breakable with a force of a predetermined value or greater;

when the rod is pushed inward with respect to the vehicle interior-exterior direction, and an associated pushing force is imposed on the outside locking lever, the pushing force is received by the first support portion and the second support portion of the housing; and a space for allowing movement of the hub portion in the vehicle interior-exterior direction so as to allow breakage at the fragile portion is provided within the housing.

3. A door lock apparatus for a vehicle according to claim 1, wherein the hub portion has a second hub-side engagement subportion slidable in the vehicle interior-exterior direction along a guide portion provided between the first support portion and the second support portion of the housing.

4. A door lock apparatus for a vehicle according to claim 2, wherein the hub portion has a second hub-side engagement subportion slidable in the vehicle interior-exterior direction along a guide portion provided between the first support portion and the second support portion of the housing.

5. A door lock apparatus for a vehicle according to claim 3, wherein the guide portion assumes the form of a recess which is recessed toward the interior of the vehicle; the second hub-side engagement subportion assumes the form of a spindle portion which is rotatably supported in the recess; the spindle portion has a curved subportion projecting toward a peripheral wall of the recess; and the curved subportion is slidably supported by the peripheral wall of the recess.

6. A door lock apparatus for a vehicle according to claim 4, wherein the guide portion assumes the form of a recess which is recessed toward the interior of the vehicle; the second hub-side engagement subportion assumes the form of a spindle portion which is rotatably supported in the recess; the spindle portion has a curved subportion projecting toward a peripheral wall of the recess; and the curved subportion is slidably supported by the peripheral wall of the recess.

7. A door lock apparatus for a vehicle according to claim 5, wherein the spindle portion is formed such that the curved subportion serves as a head subportion and such that a subportion that supports the curved subportion serves as a neck subportion; the neck subportion is elastically deformable; and the head subportion can tilt through elastic deformation of the neck subportion.

8. A door lock apparatus for a vehicle according to claim 6, wherein the spindle portion is formed such that the curved subportion serves as a head subportion and such that a subportion that supports the curved subportion serves as a neck subportion; the neck subportion is elastically deformable; and the head subportion can tilt through elastic deformation of the neck subportion.

9. A door lock apparatus for a vehicle according to claim 5, wherein the spindle portion is formed such that the curved subportion serves as a head subportion and such that a subportion that supports the curved subportion serves as a neck subportion; the neck subportion is breakable; and the neck subportion breaks before the fragile portion breaks.

10. A door lock apparatus for a vehicle according to claim 6, wherein the spindle portion is formed such that the curved subportion serves as a head subportion and such that a subportion that supports the curved subportion serves as a neck subportion; the neck subportion is breakable; and the neck subportion breaks before the fragile portion breaks.

11. A door lock apparatus for a vehicle according to claim 5, wherein an end of the spindle portion at the curved subportion is chamfered.

12. A door lock apparatus for a vehicle according to claim 6, wherein an end of the spindle portion at the curved subportion is chamfered.

13. A door lock apparatus for a vehicle according to claim 7, wherein an end of the spindle portion at the curved subportion is chamfered.

14. A door lock apparatus for a vehicle according to claim 5, wherein the arm portion has a second arm-side engagement subportion engaged in the vehicle interior-exterior direction with a third support portion which is provided on the housing in such a manner as to face the second support portion of the housing.

15. A door lock apparatus for a vehicle according to claim 5, wherein the fragile portion is formed into an arc shape along a locus of rotation of the arm portion or into a tangential shape tangent to the locus of rotation of the arm portion.

16. A door lock apparatus for a vehicle according to claim 7, wherein the arm portion has a second arm-side engagement subportion engaged in the vehicle interior-exterior direction with a third support portion which is provided on the housing in such a manner as to face the second support portion of the housing.

17. A door lock apparatus for a vehicle according to claim 1, wherein the arm portion has a second arm-side engagement subportion engaged in the vehicle interior-exterior direction with a third support portion which is provided on the housing in such a manner as to face the second support portion of the housing.

18. A door lock apparatus for a vehicle according to claim 2, wherein the arm portion has a second arm-side engagement subportion engaged in the vehicle interior-exterior direction with a third support portion which is provided on the housing in such a manner as to face the second support portion of the housing.

19. A door lock apparatus for a vehicle according to claim 1, wherein the fragile portion is formed into an arc shape along a locus of rotation of the arm portion or into a tangential shape tangent to the locus of rotation of the arm portion.

20. A door lock apparatus for a vehicle according to claim 2, wherein the fragile portion is formed into an arc shape along a locus of rotation of the arm portion or into a tangential shape tangent to the locus of rotation of the arm portion.

* * * * *